United States Patent [19]

Shibatani

[11] Patent Number: 4,950,530
[45] Date of Patent: Aug. 21, 1990

[54] CLUTCH FACING
[75] Inventor: Kenji Shibatani, Osaka, Japan
[73] Assignee: Nippon Valqua Industries, Ltd., Tokyo, Japan
[21] Appl. No.: 210,839
[22] Filed: Jun. 24, 1988
[30] Foreign Application Priority Data Jul. 14, 1987 [JP] Japan .................. 62-176655

[51] Int. Cl.$^5$ .......................................... B03D 15/00
[52] U.S. Cl. .................................. 428/259; 57/238; 192/107 M; 428/257; 428/258; 428/288; 428/364; 428/375
[58] Field of Search ............... 428/257, 258, 259, 364, 428/375, 288; 192/107 M; 57/238

[56] References Cited
U.S. PATENT DOCUMENTS 4,670,326 6/1987 Heiman .................. 428/259

Primary Examiner—James J. Bell
Attorney, Agent, or Firm—Wenderoth, Lind & Ponack

[57] ABSTRACT

In a generally annular clutch facing comprising a fibrous substrate embedded in a matrix of a cross-linked polymeric binder, the improvement in which said fibrous substrate comprises 100 parts by weight of rock wool, from 10 to 50 parts by weight of organic fiber and from 5 to 50 parts by weight of glass fiber in the form of yarn, roving, strand or code, or in the form of fabric made of such yarn, roving, strand or code, and in a generally annular clutch facing comprising a fibrous substrate in the form of woven fabric embedded in a matrix of a cross-linked polymeric binder with warp yarns of the fabric extending circumferentially of the clutch facing, the improvement in which the warp yarns of the fabric contain glass fiber, and weft yarns of the fabric contain rock wool. The clutch facings according to the invention have great tensile strength, and do not suffer from a problem of judder which is felt by a driver as vibration during operation.

10 Claims, 1 Drawing Sheet

CLUTCH FACING

FIELD OF THE INVENTION

The present invention relates to a clutch facing. More particularly, it relates to a clutch facing which has enhanced mechanical strength and exhibits reduced judder during operation.

BACKGROUND OF THE INVENTION

Generally annular clutch facings comprising a fibrous substrate embedded in a matrix of a cross-linked polymeric binder have heretofore been produced by adhering a thermosetting resin such as a phenolic resin together with fillers such as a friction improver, or a combination of a thermosetting resin, a rubber, a vulcanizing agent and a vulcanization accelerator together with fillers to a fibrous substrate comprising asbestos, glass fibers, aramid fibers polyamide fibers or carbon fibers in the form of yarn, roving, tape or fabric, forming the so treated fibrous substrate into a volute or laminate preform, and molding and curing the preform in a mold under heat and pressure to provide the desired clutch facing.

Asbestos-based clutch facings are inexpensive and have good friction properties. Moreover, they are advantageous in that they have excellent operation characteristics since asbestos having a thermosetting resin such as a phenolic resin adhered thereto still retains the softness and resiliency of untreated asbestos. Recently, however, resources of asbestos are becoming exhausted, making asbestos less available on the one hand, evidence has been found indicating that asbestos may be harmful to humans on the other hand. Thus, asbestos-free clutch facings have become of interest in recent years.

For such reasons, glass fiber-based clutch facings have been produced. They have great mechanical strength and excellent wear resistance. However, they pose problems in that when the molded product is finished by polishing or when apertures for mounting the clutch facing on a clutch disc are formed, glass dust is blown up and irritates workers on their skin; and that the heat resistance is not necessarily satisfactory. Another serious problem associated with glass fiber-based clutch facings is a juddering behavior which is felt by a driver as vibration etc. during operation of the clutch facing.

Likewise, aramide fiber-based clutch facings do not necessarily have satisfactory heat resistance.

Japanese Patent Laid-open Publication 61-52432 proposes to produce clutch facings using rock wool as a substrate. However, rock wool-based clutch facings frequently have small tensile strength, although depending upon the manufacturing process, and are generally unsuitable in applications where high rotation break strength is required.

Japanese Patent Publication 60-9528 discloses an asbestos-free friction element for low plane pressure prepared by molding under heat and pressure an admixed friction element-forming composition comprising leather powder, rock wool, vegetable fibers, a friction improver and a thermosetting resin. The disclosed friction element is, however, unsuitable for use as a clutch facing, owing to its poor mechanical strength, small friction coefficient and poor wear resistance.

Japanese Patent Laid-open Publication 57-121080 discloses a friction element comprising metallic powder, slag wool (a kind of rock wool), a binder resin and organic and inorganic fillers. The disclosed friction element has great mechanical strength, and can be used as a friction element for a brake. In a case wherein it is used as a clutch facing, however, it exhibits because of the presence of metallic powder a juddering behavior, which is felt by a driver as vibration, during operation.

OBJECT OF THE INVENTION

The invention is to solve the above-discussed problems associated with the prior art and an object of the invention is to provide a clutch facing which has great tensile strength, in particular, high rotation break strength on the one hand and which does not suffer from a problem of judder which is felt by a driver as vibration during operation of the clutch facing on the other hand.

SUMMARY OF THE INVENTION

It has now been found that the above-discussed problems can be solved by conjoint use of rock wool and glass fiber in a fibrous substrate for the preparation of clutch facings.

Thus, according to a first aspect of the invention there is provided an improvement in a generally annular clutch facing comprising a fibrous substrate embedded in a matrix of a cross-linked polymeric binder, in which improvement said fibrous substrate comprises 100 parts by weight of rock wool, from 10 to 50 parts by weight of organic fiber and from 5 to 50 parts by weight of glass fiber in the form of yarn, roving strand or code, or in the form of fabric made thereof.

According to a second aspect of the invention, there is provided an improvement in a generally annular clutch facing comprising a fibrous substrate in the form of woven fabric embedded in a matrix of a cross-linked polymeric binder with warp yarns extending circumferentially of the clutch facing, the improvement in which warp yarns of the fabric contain glass fiber and weft yarns of the fabric contain rock wool.

Glass fiber serves to enhance mechanical strength of the clutch facing, while rock wool acts to reduce judder of the clutch facing during operation. Thus, clutch facings according to the invention have a combination of conflicting properties, i.e., high mechanical strength and reduced juddering behavior during operation.

DETAILED DESCRIPTION OF THE INVENTION

Figure 1:
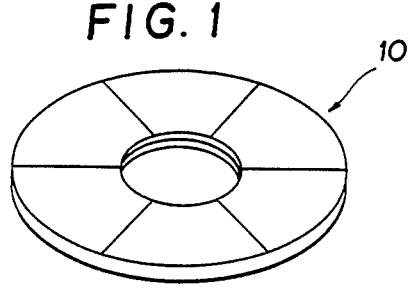
Figure 2:
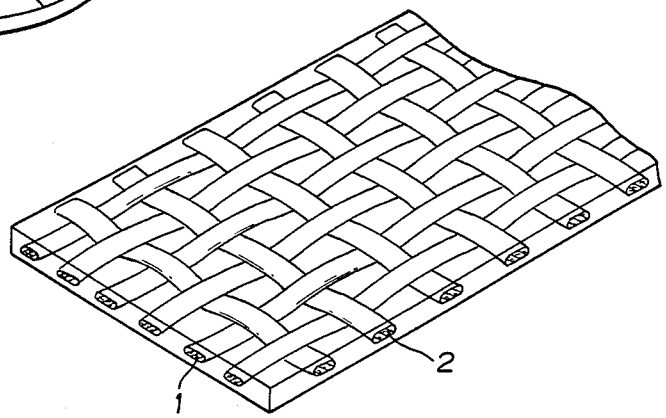
Figure 3:
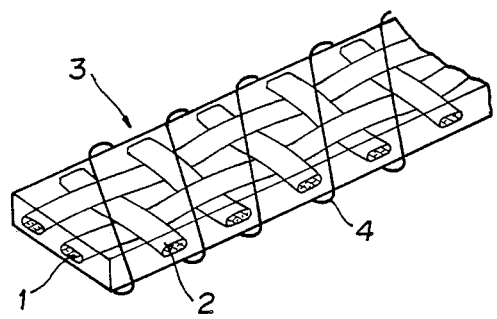
Figure 4:
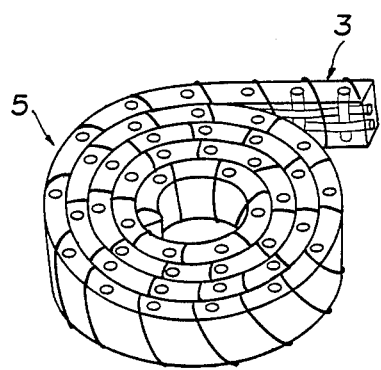

The invention will now be described in detail with reference to the attached drawings in which:

FIG. 1 is a schematic perspective view of a generally annular clutch facing;

FIG. 2 is a schematic perspective view of a fibrous substrate in the form of woven fabric which has been impregnated with a cross-linkable polymeric binder, FIG. 3 is a schematic perspective view of a tape, cut from the fabric of FIG. 2, which has been impregnated with a binder, and wrapped around by helixes of a metallic wire; and FIG. 4 is a schematic perspective view of a volute preform prepared from the tape of FIG. 4.

According to the first aspect of the invention a generally annular clutch facing 10 as shown in FIG. 1 comprises a fibrous substrate embedded in a matrix of a cross-linked polymeric binder, in which the fibrous substrate comprises 100 parts by weight of rock wool, from 10 to 50 parts, preferably from 20 to 40 parts, by weight of organic fiber and from 5 to 50 parts, preferably from 10 to 30 parts, by weight of glass fiber in the form of yarn, roving, strand or code, or in the form of fabric made thereof.

The fibrous substrate comprises ends of yarn, roving, strand or code having the above-mentioned composition, or it may be in the form of fabric made of such yarn, roving, strand or code. Each end of such yarn, roving, strand or code may have a weight of from 0.5 to 3.0 gr., preferably from 1.0 to 2.0 gr., per meter and a thickness of from 1 to 4 mm, preferably from 2 to 3 mm.

Rock wool which can be used herein is one that can be generally prepared by melting highly heat resistant ore primarily comprised of lime and silicic acid and making the molten ore into fiber by the action of centrifugal force, compressed air or steam of high pressure. Rock wool having a fiber diameter on the order of from 1 to 7 $\mu$m is preferred. Slag wool can also be used as the rock wool.

Organic fibers which can be used herein include rayon, cotton, aramid fiber, polyamide fiber, linen and acrylic fiber.

Glass fiber which can be used herein may have a fiber diameter of from 6 to 13 $\mu$m and a fiber length of from 3 to 60 mm, and may be in the form of staple or roving. The proportion of glass fiber in the fibrous substrate should be within the range between 5 and 50 parts by weight per 100 parts by weight of rock wool which is present in the fibrous substrate. With less than 5 parts by weight of glass fiber based on 100 parts by weight of rock wool, mechanical strength of the clutch facing is unsatisfactory, whereas use of glass fiber in excess of 50 parts by weight based of 100 parts by weight of rock wool should be avoided, or otherwise aggressive behaviors of the clutch facing during operation will tend to be pronounced.

The fibrous substrate may comprise ends of mixed spun yarn of rock wool, organic fiber and glass fiber or it may comprise ends of composite yarn comprising at least one end of mixed spun yarn of rock wool and organic fiber and at least one end of glass roving.

The fibrous substrate may further comprise a metallic wire plied together with the above-mentioned ends of mixed spun yarn of rock wool, organic fiber and glass fiber or with the above-mentioned ends of composite yarn comprising at least one end of mixed spun yarn of rock wool and organic fiber and at least one end of glass roving. The metallic wire may be of a diameter of the order of from 0.1 to 0.3 mm, and may be made of brass, copper, zinc or aluminum. The incorporation of metallic wire into the fibrous substrate is effective not only for enhancing the heat-releasability of the clutch facing but also for achieving a scavenger effect in that the metal wire may strip off any alien material such as decomposed resin or rubber that has deposited on the surface of the clutch facing.

The fibrous substrate may be in the form of fabric made of the above-mentioned yarn, roving, strand or code comprising 100 parts by weight of rock wool, from 10 to 50 parts by weight of organic fiber and from 5 to 50 parts by weight of glass fiber. The weave of the fabric may be plain, diagonal or satin.

Starting with the fibrous substrate as described above, annular clutch facings 10, as shown in FIG. 1, can be prepared by a method known per se. For example, a fibrous substrate comprising an array of ends of yarn, roving, strand or code may be impregnated with a solution of a cross-linkable polymeric binder, dried, made into an annular preform, by a suitable procedure including, for example, a step of wrapping it around a mandrel and molding the preform under heat and pressure to provide the desired clutch facing. In the case of a fibrous substrate which is in the form of fabric, it may be impregnated with a solution of a cross-linkable polymeric binder, dried, made into an annular preform, by a suitable procedure, for example, including a step of laminating or steps of cutting the fabric longitudinally into tapes and wrapping the tape around a mandrel and molding the preform under heat and pressure to provide the desired clutch facing. Alternatively, a so-called dry process may be employed in which the fibrous substrate is first impregnated with a solution of a thermosetting resin as a first cross-linkable polymeric binder, dried and thereafter a rubber compound containing a vulcanizable rubber as a second cross-linkable polymeric binder is adhered to the dried resin-impregnated fibrous substrate to prepare a stock suitable for the preparation of the above-mentioned preform.

According to the second aspect of the invention a generally annular clutch facing 10 as shown in FIG. 1 comprises a fibrous substrate in the form of woven fabric embedded in a matrix of a cross-linked polymeric binder with warp yarns of the fabric containing glass fiber and extending circumferentially of the clutch facing, and with weft yarns of the fabric containing rock wool.

FIG. 2 schematically depicts a woven fabric impregnated with a cross-linkable polymeric binder which can be used in the production a clutch facings according to the invention and in which the warp yarns 1 contain glass fiber and the weft yarns 2 contain rock wool.

The warp yarns 1 which have to extend circumferentially of the eventual clutch facing are required to have a great strength. While a preferred warp yarn consists essentially of ends of glass roving, which may be plied with a metallic wire, a small amount (for example, up to 30% by weight) of other fiber may be incorporated in the warp yarns.

The weft yarns 2 containing rock wool serve to reduce a juddering behavior of the clutch facing. A preferred weft yarn comprises ends of spun yarn of rock wool and up to 50%, preferably from 10 to 50% by weight of organic fiber. The weft yarn may be plied with a metallic wire, if desired.

The rock wool, organic and glass fibers, and metallic wire described hereinabove with respect to the first aspect according to the invention can be used in the second aspect according to the invention.

The fabric impregnated with a cross-linkable binder as shown in FIG. 2 is preferably longitudinally cut into tapes or stripes. The tape or stripe 3 so obtained, optionally after having at least one helix of metallic wire 4 wrapped around as shown in FIG. 3 can be used as a stock material for the preparation of a volute preform 5, as shown in FIG. 4. The preform 5 is molded and cured in an appropriate mold to provide the desired clutch facing 10, as shown in FIG. 1.

The cross-linkable polymeric binder which can be used herein is a cross-linkable thermosetting resin or a combination of a cross-linkable thermosetting resin and a vulcanizable rubber.

Examples of the cross-linkable thermosetting resin include, for example, phenolic resins, urea resins, melamine resins and epoxy resins. Of these, phenolic resins are preferred, including straight phenolic resins and modified phenolic resins such as cresol-, melamine-, rubber- and cashew-modified phenolic resins.

Examples of the vulcanizable rubber include, for example, natural rubbers and synthetic rubbers such as butadiene rubbers (BR), styrene-butadiene rubbers (SBR), isoprene rubbers, (IR), ethylene-propylene rubbers (EPR), isobutylene-isoprene rubbers (IIR), acrylonitrile-butadiene rubbers (NMR), acrylic rubbers (ACM), urethane tubbers (U), silicone rubbers (Q), fluorocarbon rubbers (FKR) and polysulfide rubbers (T). Of these, styrene-butadiene rubbers (SBR) and acrylonitrile-butadiene rubbers (NBR) are particularly preferred.

Examples of the vulcanizing agent which is used together with the vulcanizable rubber include, for example, sulfur, organic peroxides, organic sulfur-containing compounds and alkylated phenolic resins. Examples of the vulcanization accelerator which is used together with the vulcanizable rubber and vulcanizing agent include, for example, thiazoles, sulfene amides, dithiocarbamates, aldehydeamines guanidines, thioureas, xanthates, aldehydeammonias and thiurums.

Examples of the fillers such as friction improvers which may be used in admixture with the cross-linkable thermosetting resin or in admixture of the vulcanizable rubber compound include, for example, clay, talc, barium sulfate, cashew dust, graphite and calcium carbonate.

The molding and curing of the annular preform may be carried out in suitable mold normally at a temperature of from about 150° to about 200° C. and under a pressure of from about 100 to about 200 kgf/cm$^2$.

The invention will now be described by the following examples. It should be appreciated, however, that the invention is not limited to the examples.

EXAMPLE 1

Two ends of mixed spun yarn comprising 100 parts by weight of rock wool, 40 parts by weight of rayon staple and 25 parts by weight of glass fiber having a diameter of about 11 μm and a length of ranging from about 20 to about 50 mm, were plied together with a brass wire having a diameter of 0.15 mm to provide a fibrous substrate.

Ends of the fibrous substrate were impregnated with 30% by weight, based on the weight of the substrate, of a phenolic resin, followed by adhesion of 70% by weight, based on the weight of the substrate of, a rubber compound of a composition as noted below.

| Composition of the rubber compound | |
| --- | --- |
| SBR | 40% by weight |
| Sulfur | 11% by weight |
| Vulcanization accelerator | 1% by weight |
| Fillers (ZnO, clay, talc and cashew dust) | 48% by weight |

The fibrous substrate so treated was wound around a mandrel to provide a volute preform, which was molded in a mold under a pressure of 160 kgf/cm$^2$ and at a temperature of 180° C., heat treated at that temperature for 3 hours and finished by polishing, to provide an annular clutch facing having an external diameter of 200 mm and an internal diameter of 130 mm and a thickness of 3.5 mm.

The clutch facing so prepared was tested for a burst strength (rpm) at a temperature of 200° C.

The result is shown in Table 1.

EXAMPLE 2

Example 1 was repeated except that a fibrous substrate was prepared by plying together two ends of mixed spun yarn comprising 100 parts by weight of rock wool and 40 parts by weight of rayon staple, one end of glass roving comprising 25 parts by weight of glass fiber having a diameter of about 11 μm and one end ofbrass wire having a diameter of 0.15 mm.

The clutch facing so prepared was tested for a burst strength as in Example 1.

The result is shown in Table 1.

Comparative Example 1

Example 1 was repeated except that a fibrous substrate was prepared by plying together two ends of mixed spun yarn comprising 100 parts by weight of rock wool and 40 parts by weight of rayon staple and one end of brass wire having a diameter of 0.15 mm.

The clutch facing so prepared was tested for a burst strength as in Example 1.

The result is shown in Table 1.

TABLE 1

| | Burst strength (rpm) |
| --- | --- |
| Example 1 | 9,000 |
| Example 2 | 10,000 |
| Comp. Example 1 | 6,500 |

As revealed from Table 1, clutch facings according to the invention have excellent burst strength (mechanical strength).

EXAMPLE 3

Using yarns prepared by plying 3 ends of 400 tex glass roving having a diameter of 11 μm with one end of brass wire having a diameter of 0.15 mm as a warp, and yarns having a weight of about 1.6 g/m prepared by plying three ends of mixed spun yarn comprising rock wool and 20% by weight, based on the weight of the mixed spun yarn, of rayon staple with one end of brass wire having a diameter of 0.15 mm as a weft, a fabric was woven with 4 ends of warp/inch and 4 ends of weft/inch.

The fabric was impregnated with 30% by weight, based on the weight of the fabric, of a phenolic resin, followed by adhesion of 70% by weight, based on the weight of the substrate of, a rubber compound of a composition as noted below.

| Composition of the rubber compound | |
| --- | --- |
| SBR | 40% by weight |
| Sulfur | 10% by weight |
| Vulcanization accelerator | 1% by weight |
| Fillers (ZnO, clay, talc and cashew dust) | 49% by weight |

The fabric so treated was longitudinally cut into tapes having a width of 15 mm, which were formed to a volute preform.

The preform was molded in a mold under a pressure of 200 kgf/cm$^2$ and at a temperature of 180° C., heat treated at a temperature of 200° C. for 3 hours and finished by polishing, to provide an annular clutch facing having an external diameter of 200 mm and an internal diameter of 130 mm and a thickness of 3.5 mm.

The clutch facing so prepared was tested for a burst strength (a rotation break strength in rpm) at a temperature of 200° C. Further, it was mounted on an actual car, and a judder index, that is a variation in acceleration (in G) at the time of starting the car was measured by means of an acceleration meter. The judder index is a measure indicating a juddering behavior of the clutch facing during operation, and the larger the judder index the more juddering. The result is shown in Table 2.

Comparative Example 2

Example 3 was repeated except that yarns prepared by plying 3 ends of 400 tex glass roving having a diameter of 11 μm with one end of brass wire having a diameter of 0.15 mm were used as both warp and weft.

The result is shown in Table 2.

Comparative Example 3

Example 3 was repeated except that yarns having a weight of about 1.6 g/m prepared by plying 3 end of mixed spun yarn comprising rock wool and 20% by weight, based on the weight of the mixed spun yarn, of rayon staple with one end of brass wire having a diameter of 0.15 mm were used as both warp and weft.

The result is shown in Table 2.

TABLE 2

|  | Judder index (G) | Burst strength (rpm) |
| --- | --- | --- |
| Example 3 | 0.09 | 11,000 |
| Comp. Example 2 | 0.12 | 10,700 |
| Comp. Example 3 | 0.09 | 8,000 |

Table 2 reveals that the clutch facing of Example 3 according to the invention has a combination of a low judder index indicating good operation characteristics with a high rotation break strength.

What is claimed is:

1. In a generally annular clutch facing comprising a fibrous substrate embedded in a matrix of a cross-linked polymeric binder, the improvement in which said fibrous substrate comprises a blend of 100 parts by weight of rock wool, from 10 to 50 parts by weight of organic fiber and from 5 to 50 parts by weight of glass fiber in the form of yarn, strand or cord, or in the form of fabric made thereof.

2. The clutch facing according to claim 1 wherein said fibrous substrate comprises a blend of 100 parts by weight of rock wool, from 20 to 40 parts by weight of organic fiber and from 10 to 30 parts by weight of glass fiber.

3. The clutch facing according to claim 1 wherein said fibrous substrate comprises mixed spun yarn of rock wool, organic fiber and glass fiber.

4. The clutch facing according to claim 3 wherein said fibrous substrate further comprises a metallic wire plied together with said ends of mixed spun yarn of rock wool, organic fiber and glass fiber.

5. The clutch facing according to claim 1 wherein said fibrous substrate comprises ends of composite yarn comprising at least one end of mixed spun yarn of rock wool and organic fiber and at least one end of glass roving.

6. The clutch facing according to claim 5 wherein said fibrous substrate further comprises a metallic wire plied together with said ends of composite yarn.

7. In a generally annular clutch facing comprising a fibrous substrate in the form of woven fabric embedded in a matrix of a cross-linked polymeric binder with warp yarns of the fabric extending circumferentially of the clutch facing, the improvement in which warp yarns of the fabric contain glass fiber, and weft yarns of the fabric contain rock wool.

8. The clutch facing according to claim 7 wherein said warp yarns each comprises ends of glass roving and said weft yarns each comprises at least one end of mixed spun yarn of rock wool and from up to 50 parts by weight, based on 100 parts by weight of the rock wool, of organic fiber.

9. The clutch facing according to claim 8 wherein said warp yarns each comprises said ends of glass roving plied with a metallic wire, and said weft yarns each comprises said at least one end of mixed spun yarn of rock wool and organic fiber plied with a metallic wire.

10. The clutch facing according to claim 7 wherein said fabric is a tape having at least one helix of a metallic wire wrapped around.

* * * * *